United States Patent [19]
Babuder et al.

[11] Patent Number: 4,552,389
[45] Date of Patent: Nov. 12, 1985

[54] FLUID COUPLING
[75] Inventors: Gerald A. Babuder, Mentor; Jeffrey L. Weigl, Cleveland, both of Ohio
[73] Assignee: Cajon Company, Macedonia, Ohio
[21] Appl. No.: 410,408
[22] Filed: Aug. 23, 1982
[51] Int. Cl.⁴ .............................................. F16L 19/00
[52] U.S. Cl. .................................... 285/379; 285/108; 285/DIG. 11; 277/9.5; 277/189
[58] Field of Search ............... 285/108, DIG. 11, 379, 285/328, 380; 277/189, 9.5, 11

[56] References Cited
U.S. PATENT DOCUMENTS

| 949,658 | 2/1910 | Randall . | |
|---|---|---|---|
| 2,292,216 | 8/1942 | Doran | 123/169 |
| 2,462,762 | 2/1949 | Nardin | 288/27 |
| 2,619,357 | 11/1952 | Montgomery | 279/60 |
| 2,871,036 | 1/1959 | Goodman | 285/379 X |
| 3,262,722 | 7/1966 | Gastineau | 285/212 |
| 3,521,910 | 7/1970 | Callahan et al. | 285/14 |

FOREIGN PATENT DOCUMENTS

| 651733 | 11/1962 | Canada | 277/189 |
|---|---|---|---|
| 1163710 | 9/1969 | United Kingdom . | |
| 1167680 | 10/1969 | United Kingdom . | |
| 2126301 | 3/1984 | United Kingdom | 285/379 |

Primary Examiner—Richard J. Scanlan, Jr.
Assistant Examiner—Eric S. Katz
Attorney, Agent, or Firm—Fay, Sharpe, Fagan, Minnich & McKee

[57] ABSTRACT

A retainer device for maintaining an annular sealing gasket in some predetermined position intermediate and substantially coaxial with opposed annula sealing beads extending axially from each of a pair of coupling components. The retainer includes an annular end wall and a cylindrical side wall which define a cavity for closely receiving the gasket. A plurality of axial retaining legs facilitate retainer mounting to one of the coupling members so that the gasket is captured in the retainer cavity substantially coaxial with the one coupling member and with the associated sealing bead engaging one of the gasket faces. The new retainer accommodates precise positioning of the gasket relative to the coupling components at initial coupling makeup and does not interfere with the coupling components themselves. The retainer also advantageously permits precise repositioning of the gasket relative to the component sealing beads during subsequent disassembly and reassembly of the coupling.

21 Claims, 4 Drawing Figures

FLUID COUPLING

BACKGROUND OF THE INVENTION

This invention relates to fluid couplings and, more particularly, to a type of coupling suitable for use in both pressure and vacuum applications.

A wide variety of fluid couplings are available for use with both high and low temperatures and in both high pressure and vacuum environments. One such coupling which has found significant commercial acceptance is disclosed in the commonly assigned U.S. Pat. No. 3,521,910 to F. J. Callahan Jr., et al. In this coupling, a pair of coupling components are provided which have fluid passageways extending longitudinally therethrough. A generally annular rib or sealing bead extends axially outward from the end face of each coupling component in a surrounding relationship with the associated fluid passageway. The components themselves are adapted to be placed in an end-to-end relationship so that the sealing beads are disposed in opposed relation to each other. A generally annular sealing gasket is interposed between the sealing beads, and means are advantageously provided for drawing the components axially toward each other in order that the sealing beads will sealingly engage the opposed faces of the gasket. During assembly or makeup of the coupling, the sealing beads produce slight indentations in the gasket faces.

While the foregoing coupling construction has indeed met with substantial commercial success and has provided improved coupling capabilities over a wide range of system and operating parameters, one difficulty which has been encountered resides in precisely positioning the annular gasket between the annular sealing beads at initial coupling makeup and at subsequent reassembly after disassembly. Because of the basic construction involved, it has been found that the gasket is not always substantially coaxially disposed with the annular sealing beads. This result may, to some extent, adversely affect the overall sealing results. Moreover, and while the sealing beads produce only slight indentations in the gasket at coupling makeup, it is necessary to precisely reposition the gasket when the coupling is disassembled and then reassembled.

Because of problems encountered in achieving the necessary precise repositioning, it has heretofore been the practice to simply insert a new gasket each time the coupling was disassembled and then reassembled. While no particularly great expense is involved by replacing the gaskets, it necessarily requires that maintenance personnel, installers, and the like maintain a ready supply of gaskets in various sizes when working in the field. Such requirement is considered undesirable for many installations and uses of the coupling.

Accordingly, it has been considered desirable to develop an arrangement which would facilitate positive mounting of the gasket relative to the coupling components and sealings beads in order that precise gasket positioning would be assured. Moreover, such an arrangement would advantageously facilitate precise repositioning of the gasket at subsequent disassembly and reassembly of the coupling to eliminate the need for gasket replacement as per the prior accepted practice.

The subject invention contemplates an improved arrangement which overcomes the foregoing needs and others and provides an improved coupling construction which accommodates precise location of a sealing gasket between a pair of opposed annular sealing beads in a fluid coupling construction.

BRIEF DESCRIPTION OF THE INVENTION

The subject invention advantageously provides a gasket retainer device which facilitates retention of an annular sealing gasket on one of a pair of coupling components for precisely locating the gasket intermediate a pair of opposed annular sealing beads in a substantially coaxial relationship therewith.

More particularly, the subject new arrangement is adapted for use in a fluid coupling of the type having first and second generally cylindrical coupling components which include opposed radial end faces having generally annular sealing beads extending axially therefrom toward each other and with an annular sealing gasket interposed therebetween. The coupling also includes means for moving the components into a closely-spaced coaxial relationship so that the sealing beads sealingly engage the opposed gasket faces. The improvement comprises a retainer for maintaining the gasket in a predetermined located position relative to the end face of one of the coupling components. This retainer includes an annular end wall and a plurality of retaining legs extending outwardly of the end face in a direction generally normal thereto. The legs are disposed in a retaining relationship with the one component at an area thereof spaced axially rearward from the area of the radial end face. The gasket itself is disposed intermediate the annular end wall of the retainer and the one component end face. The retainer annular end wall has an inside diameter greater than the outside diameter of the annular sealing bead on the end face of the other of the components. The retainer construction is such that the gasket is disposed in a substantially coaxial relationship with the components as they are moved toward a closely-spaced relationship with each other by the moving means. Also, the retainer assures that the sealing beads engage substantially the same annular areas of the gasket during subsequent coupling disassembly and reassembly steps.

According to another aspect of the invention, the retainer includes a cylindrical side wall portion extending from the end wall in the same direction as the retaining legs. The side and end walls define a receiving cavity which captures the gasket and prevents radial movement thereof relative to the one coupling component.

According to another aspect of the invention, the axial dimension of the retainer side wall is at least only slightly greater than the thickness of the gasket.

In accordance with still another aspect of the invention, the axial dimension of the sealing bead associated with the other component is greater than the thickness of the retainer end wall.

In accordance with a further aspect of the invention, the internal diameter of the retainer cavity is at least slightly greater than the diameter of the one component radial end face thereof.

According to yet another aspect of the invention, the retainer legs effectively define a coupling component engaging band dimensioned so that the retainer legs are biased radially outward as the retainer is installed on the one component.

The principal object of the invention is the provision of an improved arrangement for maintaining a sealing gasket in a predetermined desired position between a pair of opposed annular sealing beads on cooperating coupling components.

Another object of the invention is the provision of such arrangement which facilitates reuse of the gasket upon subsequent disassembly and reassembly of the coupling.

Still another object of the invention is the provision of a gasket retaining arrangement which does not in any way interfere with or impair the sealing achieved between opposed sealing components.

Still other objects and advantages of the present invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
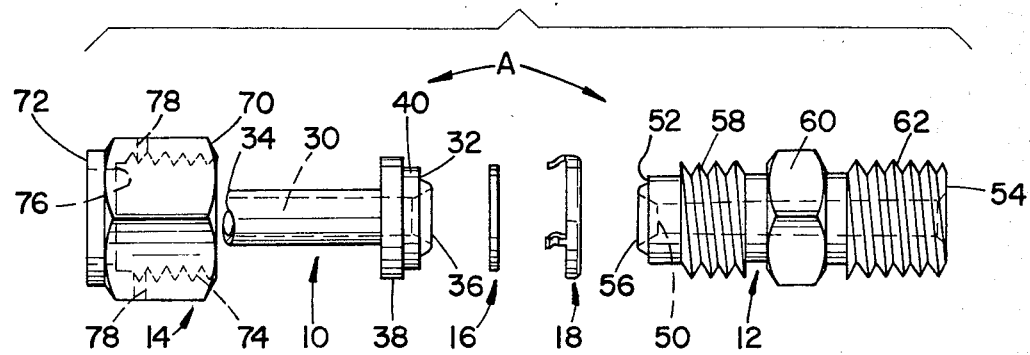
FIG. 1 is an exploded side elevational view of a fluid coupling which incorporates the subject invention thereinto.

Referring now to the drawings wherein the showings are for purposes of illustrating a preferred embodiment of the invention only and not for purposes of limiting same, FIG. 1 shows a fluid connector or coupling A which incorporates the subject invention. The basic construction of the coupling is known in the art as shown in commonly assigned U.S. Pat. No. 3,521,910 to F. J. Callahan, et al. The specific teachings of this prior patent and the coupling construction disclosed thereby are incorporated herein by reference.

Figure 2:
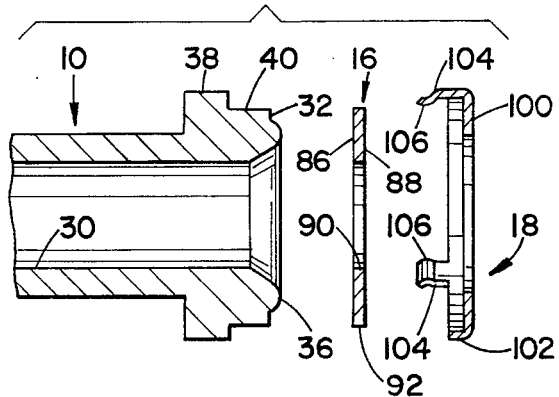
FIG. 2 is an enlarged, exploded cross-sectional view of a portion of the structural arrangement shown in FIG. 1.

More particularly, and with reference to both FIGS. 1 and 2, connector or coupling A is comprised of a first coupling component 10, a second coupling component 12, a coupling nut 14, a gasket 16, and a gasket retainer 18.

First coupling component 10 includes a suitable fluid passageway 30 extending longitudinally therethrough between a radial inner or end face 32 and an outer or terminal end 34. While terminal end 34 may include any convenient means for affixing coupling component 10 to a fluid line, a male or female tube receiving area (not shown) is contemplated in the embodiment here described. However, any other conventional arrangement such as threaded connecting means, ferrule-type tube couplings, and other arrangements may also be suitably employed.

An annular, radiused sealing bead or rib 36 extends axially outward from radial end face 32 in a coaxial relationship with passageway 30 to effect a sealing relationship with gasket 16 in a manner to be described. A circumferential locating or mounting flange 38 is spaced axially along first coupling component 10 some predetermined distance from end face 32. An area 40 having a diameter less than that of flange 38 and greater than the outside diameter of sealing bead 36 is disposed axially between end face 32 and the flange. The reasons and purposes for this configuration will become apparent hereinafter.

Second coupling component 12 includes a fluid passageway 50 extending longitudinally thereof between a radial inner or end face 52 and an outer or terminal end 54. An annular, radiused sealing bead 56, which is substantially identical to bead 36, extends axially outward of radial end face 52 in a coaxial relationship with the passageway 50. As shown in FIG. 1, second coupling component 12 includes a threaded area 58 rearwardly adjacent end face 52 for threaded cooperation with nut 14, an intermediate, slightly enlarged hexagonal tool receiving area 60, and a threaded area 62 adjacent outer or terminal end 54. In the embodiment shown, threaded area 62 comprises pipe threads for conveniently securing the connector to associated or adjacent structure.

It will be readily appreciated, however, that other configurations for second coupling component 12 may also be advantageously employed. Moreover, alternative arrangements may be suitably employed in place of threaded area 58 for purposes of drawing sealing beads 36,56 toward each other into sealing engagement with gasket 16 and in place of threaded area 62 for mounting the coupling to associated structure or to a fluid line. One alternative comprises a pair of opposed glands wherein each gland is configured similarly to the one shown as first coupling component 10 in the FIGURES. In this case, a separate male nut is associated with one gland and a separate female nut is associated with the other gland. These nuts, in turn, threadably mate with each other to draw the glands into sealing engagement with the gasket. Still other alternative arrangements include tees, crosses, elbows, unions, and the like.

Coupling nut 14 comprises an open-ended structure having a forward end 70 and a rear end 72 with the interior of the nut being threaded as at 74 from the forward toward the rear end. Threads 74 are adapted to mate with threads 58 on second coupling component 12 for drawing components 10,12 toward each other in a manner to be described. A radially inward extending shoulder 76 is disposed at nut rear end 72 and has a smaller inside diameter than the outside diameter of circumferential flange 38 on coupling component 10. Thus, shoulder 76 may act against flange 38 as an engaging and retaining means for the first coupling component as will be described. A pair of generally opposed leak test ports 78 radially penetrate the side wall of the nut for reasons well known in the art.

With particular reference to FIG. 2, gasket 16 comprises an annular member having generally opposed face areas 86,88. Inside diameter 90 is approximately the same diameter as component passages 30,50 (FIG. 1) and outside diameter 92 is preferably slightly larger than the diameter of portion 40 on first component 10.

Figure 3:
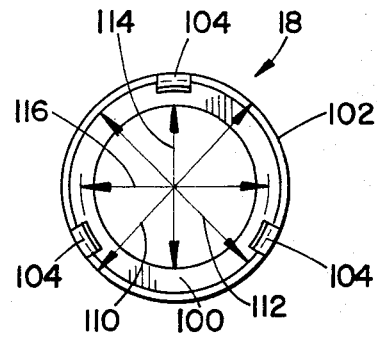
FIG. 3 is an end view of the subject new gasket retainer.

In accordance with the subject invention, and with particular reference to FIGS. 2 and 3, retainer device 18 is advantageously provided for mounting gasket 16 on first component 10 in a precise location intermediate sealing beads 36,56 when the coupling is assembled. As shown, retainer 18 is comprised of an annular end wall 100 having a generally cylindrical side all 102 extending generally normal thereto for defining a gasket receiving cavity.

Extending outwardly from the outer or free edge of side wall 102 are a plurality of substantially identical retaining legs 104. As shown in FIGS. 2 and 3, the preferred embodiment of the invention contemplates use of three equidistantly spaced-apart legs, although a different number or different relative spacing could also be satisfactorily employed. Each of retaining legs 104 is formed to include an engaging means or area 106 adjacent the outer terminal end thereof. As shown, these engaging means are somewhat U-shaped and conformed so that the base area of each is disposed radially inward of the associated leg 104. Each of areas 106 has an arcuate conformation thereacross between the opposite side edges of the associated leg 104 so that at least some line contact is made circumferentially of area 40 when the retainer is installed. It will be appreciated that other forms of engaging means may also be satisfactorily employed. For example, generally V-shaped, arcuate shaped, or still other conformations may be used in place of the generally U-shape as necessary and/or desired. Such modifications do not in any way depart from the overall intent or scope of the present invention.

Retainer 18 may conveniently comprise a stamping or the like formed of a suitable metal. Typically, however, the retainer will be stamped from stainless steel because this metal is particularly suited for use in a wide variety of fluid system environments.

The retainer is constructed to include particular dimensional characteristics. In this regard, and with continued reference to FIGS. 2 and 3, the depth of the gasket receiving cavity defined by end wall 100 and side wall 102 is such that, at most, it is only slightly greater than the thickness of gasket 16. This assures that the gasket will be fully received in the cavity for obtaining accurate and consistent locating results relative to component 10 without physically interfering with the component. The outside diameter 110 of side wall 102 is, at most, only slightly greater than the diameter of first component flange 38. The inside diameter 112 of the side wall is such that the gasket 16 will be fairly closely received in the cavity and thus prevented from radial movement relative to end face 32. Inside diameter 114 of retainer end wall 100 is at least slightly greater than the outside diameter of sealing bead 56 so that there is no interference between the retainer end wall and sealing bead. Also, the thickness of end wall 100 is less than the axial extension of sealing bead 56 from its associated radial end face 52.

U-shaped engaging means 106 define, in combination with each other, an engaging band or zone. The diameter 116 of this zone is slightly less than the diameter of first component portion 40. Still further, the length of legs 104 is such that when gasket 16 is received in the receiving cavity of retainer 18 and the retainer is thereafter installed on component 10, the outermost or terminal ends of the legs will be disposed in a non-contacting relationship with flange 38.

Figure 4:
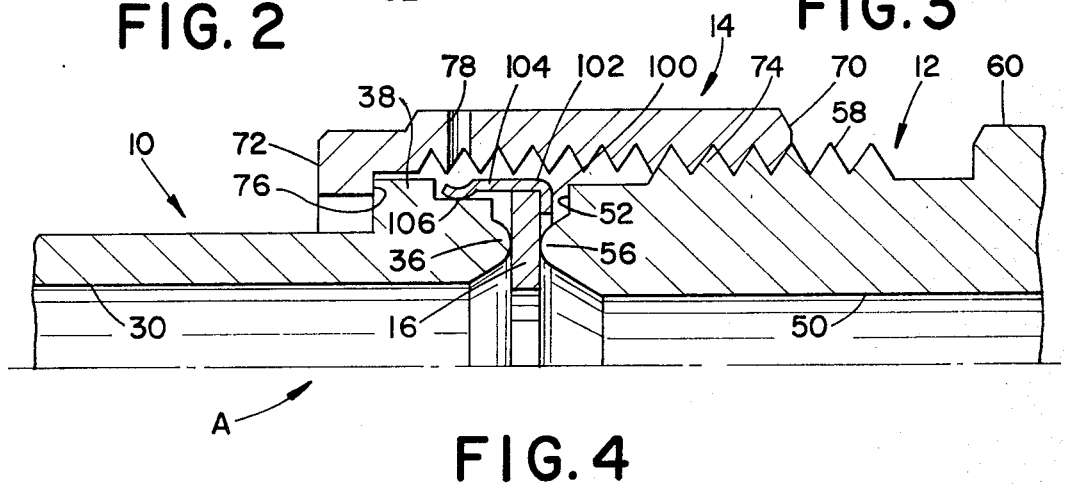
FIG. 4 is a partial, further enlarged cross-sectional view of the coupling of FIG. 1 in the assembled condition.

FIG. 4 shows the coupling of FIG. 1 in an assembled condition with the retainer and gasket cooperatively installed therein. At the time of assembly, gasket 16 is placed in the retainer receiving cavity for close confinement thereby. The retainer may then be installed onto component 10 by radially positioning it generally coaxial with the component and then axially inserting the retainer thereonto with engaging means 106 frictionally engaging area 40. Because diameter 116 (FIG. 3) is less than the diameter of area 40, legs 104 will be urged radially outward so that a biasing type of retaining force will continuously be exerted on surface 40. Because of the close dimensional relationships between the gasket and retainer, the gasket is thus substantially coaxially mounted on component 10 in a captured relationship between retainer end wall 100 and sealing bead 36.

In addition to securing retainer 18 to component 10, the U-shaped or arcuate conformation of engaging means 106 is desirable for other reasons. First, the radially outward extending nature of the engaging means adjacent the ends of the legs renders it somewhat easier to install the retainer onto coupling component 10. Second, the arcuate conformation reduces the likelihood of inadvertently contacting sealing bead 36 during retainer installation. Such contact may scratch or mar the sealing bead and adversely affect the sealing relationship with gasket 16.

Coupling nut 14 may then be advanced onto component 12 by means of threaded engagement between threaded areas 74,58. Advancement of the nut onto component 12 thus effectively draws components 10,12 coaxially toward each other until sealing beads 36,56 sealingly engage the opposed faces of gasket 16. Retainer 18 advantageously maintains a coaxial location for the gasket with the sealing beads during this fitting makeup process.

In the particular fitting construction here under discussion, coupling components 10,12 and coupling nut 14 are typically manufactured from stainless steel. Sealing gasket 16, in turn, is constructed from nickel or the like. In addition, other materials may also be suitably employed for the coupling components and gasket to achieve desired results in a wide variety of different environments. At the time of fitting makeup in the manner shown by FIG. 4, sealing beads 36,56 will produce slight annular indentations in the opposite faces of the gasket.

Even with such slight indentations, and upon disassembly of the fitting for maintenance or like purposes, it is necessary to coaxially realign the gasket with sealing beads 36,56 when the coupling is reassembled. If substantial realignment is not obtained, undesired fitting leakage could occur. Heretofore, a new gasket was inserted into the coupling each time the coupling was disassembled and then reassembled. The necessity for this action has been considered undesirable, particularly when working in the field.

However, by using retainer 18 in the manner described above, gasket 16 is always maintained in the preselected position substantially coaxial with sealing beads 36,56. Even when the coupling is disassembled and later reassembled, the retainer assures that the gasket is automatically coaxially realigned with the annular sealing beads to thereby prevent the potential for coupling leaks due to gasket misalignment. As a result, the necessity or desirability for installing a new gasket is successfully overcome.

The particular spacial relationships described above with reference to FIG. 3 assure that the retainer will in no way interfere with the cooperative sealing relationships between the coupling components themselves. For example, the external diameter of the retainer is such that it will not interfere with the inside wall of coupling nut 14. The inside diameter of retainer annular end wall 100 and the thickness of end wall 100 are such that they will not interfere with sealing bead 56 and radial end face 52 at coupling makeup. The inside diameter of retainer side wall 102 fairly closely embraces the outside periphery of the gasket and legs 104 have an axial extent which will not interfere with flange 38. Finally, U-shaped engaging means 106 engage area 40 with line contact over short accurate spans and cumulatively define an engaging band or zone which assures good frictional engagement with area 40.

The invention has been described with reference to a preferred embodiment. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. In a fluid coupling of the type having first and second generally cylindrical coupling components including fluid passageways extending longitudinally thereof, said components having opposed radial end faces including generally annular sealing beads extending axially therefrom toward each other with an annular sealing gasket interposed therebetween, said coupling further including means for moving said components into a close-spaced substantially coaxial relationship such that said sealing beads sealingly engage opposite face areas of said gasket, the improvement comprising:

a retainer device for maintaining said gasket in a predetermined located position relative to the end face of one of said components in a substantially coaxial relationship therewith, said retainer including an annular end wall and a plurality of retaining legs extending outwardly of said end wall in a direction generally normal thereto in a retaining relationship with said one component and an area thereof spaced axially rearward from the associated radial end face, said retaining legs and said end wall defining a cavity which captures said gasket for preventing radial movement thereof relative to said one component end face such that said gasket is positively located intermediate the annular end wall of said retainer and the sealing bead at said one component end face, said annular end wall having an inside diameter greater than the outside diameter of the annular sealing bead on the end face of the other of said components and less than the outer diameter of said gasket, whereby said gasket is positively located in a generally coaxial relationship with said components when they are moved toward said closely spaced relationship by said moving means, said sealing beads each engaging substantially the same portion of the associated gasket face area during subsequent disassembly and reassembly of the coupling.

2. In a fluid coupling of the type having first and second generally cylindrical coupling components including fluid passageways extending longitudinally thereof, said components having opposed radial end faces including generally annular sealing beads extending axially therefrom toward each other with an annular sealing gasket interposed therebetween, said coupling further including means for moving said components into a close-spaced substantially coaxial relationship such that said sealing beads sealingly engage opposite face areas of said gasket, the improvement comprising:

a retainer device for maintaining said gasket in a predetermined located position relative to the end face of one of said components in a substantially coaxial relationship therewith, said retainer including an annular end wall and a plurality of retaining legs extending outwardly of said end wall in a direction generally normal thereto in a retaining relationship with said one component at an area thereof spaced axially rearward from the associated radial end face, said retainer further including a cylindrical side wall portion extending from said end wall in the same direction as said retaining legs and defining a cavity with said end wall capturing said gasket intermediate said retainer end wall and the sealing bead at said one component end face and preventing radial movement thereof relative to said one component end face, said annular end wall having an inside diameter greater than the outside diameter of the annular sealing bead on the end face of the other of said components, whereby said gasket is positively located in a generally coaxial relationship with said components when they are moved toward said closely-spaced relationship by said moving means, said sealing beads each engaging substantially the same portion of the associated gasket face area during subsequent disassembly and reassembly of the coupling.

3. The improvement as defined in claim 2 wherein the axial dimension of said side wall is at least only slightly greater than the thickness of said gasket.

4. The improvement as defined in claim 3 wherein the axial dimension of the sealing bead associated with said other component radial end face is greater than the thickness of said retainer end wall.

5. The improvement as defined in claim 1 wherein the diameter of said cavity is at least slightly greater than the diameter of said one component radial end face.

6. In a fluid coupling of the type having first and second generally cylindrical coupling components including fluid passageways extending longitudinally thereof, said components having opposed radial end faces including generally annular sealing beads extending axially therefrom toward each other with an annular sealing gasket interposed therebetween, said coupling further including means for moving said components into a close-spaced substantially coaxial relationship such that said sealing beads sealingly engage opposite face areas of said gasket, wherein said moving means comprises an open-ended first coupling member threaded from one end thereof toward the other for threaded engagement with one of said other component and a second coupling member and wherein said first coupling member includes a radial shoulder which drivingly engages a radially outward flange on said one component axially spaced from the radial end face thereof, the improvement comprising:

a retainer device for maintaining said gasket in a predetermined located position relative to the end face of one of said components in a substantially coaxial relationship therewith, said retainer including an annular end wall and a plurality of retaining legs extending outwardly of said end wall in a direction generally normal thereto in a retaining relationship with said one component and an area thereof spaced axially rearward from the associated radial end face, said one component including an area of reduced diameter between said flange and said radial end face for receiving said retainer legs axially thereonto for securing said retainer on said one component with said gasket disposed in a desired position, said retaining legs and said end wall defining a cavity which captures said gasket for preventing radial movement thereof relative to said one component end face such that said gasket is positively located intermediate the annular end wall of said retainer and the sealing bead at said one component end face, said annular end wall having an inside diameter greater than the outside diameter of the annular sealing bead on the end face of the other of said components, whereby said gasket is positively located in a generally coaxial relationship with said components when they are moved toward said closely spaced relationship by said moving means, said sealing beads each engaging substantially the same portion of the associated gasket face area during subsequent disassembly and reassembly of the coupling.

7. The improvement as defined in claim 6 wherein the outer diameter of said retainer end wall is greater than the diameter of said one component reduced diameter area and at most only slightly greater than the diameter of said one component flange.

8. The improvement as defined in claim 6 wherein said gasket has a diameter which is at least slightly greater than the diameter of said one component reduced diameter area and less than the diameter of said one component flange.

9. The improvement as defined in claim 6 wherein said plurality of retainer legs include gripping means spaced therealong for frictionally engaging said one component reduced diameter area.

10. The improvement as defined in claim 9 wherein said gripping means comprises generally U-shaped areas adjacent the free ends of said legs with the bases of said U-shaped areas disposed radially inward from said legs for defining a gripping band having a diameter at least slightly less than the diameter of said one component reduced diameter area.

11. The improvement as defined in claim 10 wherein said bases have an arcuate conformation laterally between the opposed side edge of said legs.

12. In a fluid coupling of the type having first and second coupling components which include fluid passageways longitudinally thereof, opposed radial end faces having opposed annular sealing beads coaxial with said passageways and extending axially from said end faces toward each other with an annular sealing gasket interposed therebetween, one of said components including a radially outward extending flange axially spaced along a cylindrical portion of said one component from the end face thereof; a first coupling member adapted for threaded engagement with one of the other component and a second coupling member and having a radial shoulder for driving engagement with said outwardly extending flange, whereby advancement of the threadedly engaged relationship between said first coupling member and said one of said other component and said second coupling member causes said components to be coaxially drawn together for urging the sealing beads on said radial end faces to be moved into sealing engagement with opposite face areas of said gasket, the improvement comprising:

a retainer for maintaining said gasket in a predetermined located position relative to the end face of said one component, said retainer including an annular end wall having an inside diameter greater than the outside diameter across said annular sealing beads, a generally cylindrical side wall normal to said end wall and defining a gasket receiving cavity therewith, said side wall having an inside diameter at least slightly greater than said one component cylindrical portion with said side wall having a length from said end wall which at most is only slightly greater than the thickness of said gasket, said retainer further including a plurality of retaining legs extending outwardly from the free edge of said side wall at circumferentially spaced intervals therearound in a direction generally normal to said end wall, said legs including means for engaging said one component cylindrical portion for maintaining said retainer in a mounted relationship on said one component with said gasket captured in said cavity in a substantially coaxial relationship with the sealing bead on said one component radial end face.

13. The improvement as defined in claim 12 wherein the annular sealing bead on the radial end face of said other component extends axially outward of the associated radial end face by some predetermined distance, the thickness of said retainer end wall being less than said predetermined distance.

14. The improvement as defined in claim 12 wherein said engaging means comprises engaging areas adjacent the outer free ends of said legs for frictionally engaging said one component cylindrical portion, said engaging areas having a first normal position cumulatively defining an engaging band having a diameter less than said cylindrical area and being biased radially outward to a retaining position when said retainer is installed onto said one component cylindrical portion.

15. The improvement as defined in claim 12 wherein said radially outward extending flange comprises an annular flange and said one component cylindrical portion has a diameter which is less than the outside diameter of said flange; and, said retainer being dimensioned such that the outside diameter of said side wall is at most slightly greater than the outside diameter of said flange.

16. The improvement as defined in claim 12 wherein the length of said legs is such that the outer free ends thereof are axially spaced from said one component flange toward said one component radial end face when said retainer is mounted to said one component cylindrical portion with said gasket in a captured relationship in said cavity.

17. A spring type gasket retainer adapted to maintain a generally annular gasket having opposed face areas in a substantially coaxial relationship with an annular sealing bead extending axially outward from the radial end face of a generally cylindrical fluid coupling component in a surrounding relationship with a fluid passageway extending through said component, said retainer comprising:

an annular end wall having an inside diameter greater than the outside diameter of the sealing bead on the fluid fitting component with which said retainer is to be associated, a generally cylindrical side wall normal to said end wall defining a gasket receiving cavity with said end wall, said wall having an inside diameter dimensioned to fairly closely receive a generally annular gasket having an outside diameter slightly greater than the radial end face of a fluid fitting component with which it is to be associated and said side wall having a length from said end wall which is less than the sum of the gasket thickness and the axial extension of the sealing bead from the component radial end face, said retainer further including a plurality of retaining legs extending outwardly from the free edge of said side wall at circumferentially spaced intervals therearound in a direction generally normal to said end wall, said legs including means adapted for engaging a fluid fitting component at an area thereof spaced axially rearward of the component radial end face for maintaining said retainer in a mounted relationship on the component with a gasket captured in said cavity in a substantially coaxial relationship with the component sealing bead.

18. The retainer as defined in claim 17 wherein said end wall has a thickness which is less than the axial extension of the sealing bead from the radial end face of the component with which said retainer is to be associated.

19. The retainer as defined in claim 17 wherein said engaging means comprises engaging areas adjacent the outer free ends of said legs adapted to frictionally engage on associated fluid fitting component, said engaging areas having a first normal position cumulatively defining an engaging band having a diameter less than the area of the associated component which is to be engaged thereby and being urged radially outward to a biasing position when said retainer is installed onto the component.

20. The retainer as defined in claim 19 wherein said engaging means comprises generally U-shaped areas along said legs adjacent the outer free ends thereof with the base portions of such areas disposed radially inward of said legs.

21. The retainer as defined in claim 20 wherein said base portions have arcuate conformations laterally across said legs.

* * * * *